Oct. 23, 1934.  H. T. WHEELER  1,978,240
MAKING OF PACKING RINGS
Filed Jan. 19, 1931   2 Sheets-Sheet 1

INVENTOR.
Harley T Wheeler

Oct. 23, 1934.   H. T. WHEELER   1,978,240
MAKING OF PACKING RINGS
Filed Jan. 19, 1931   2 Sheets-Sheet 2
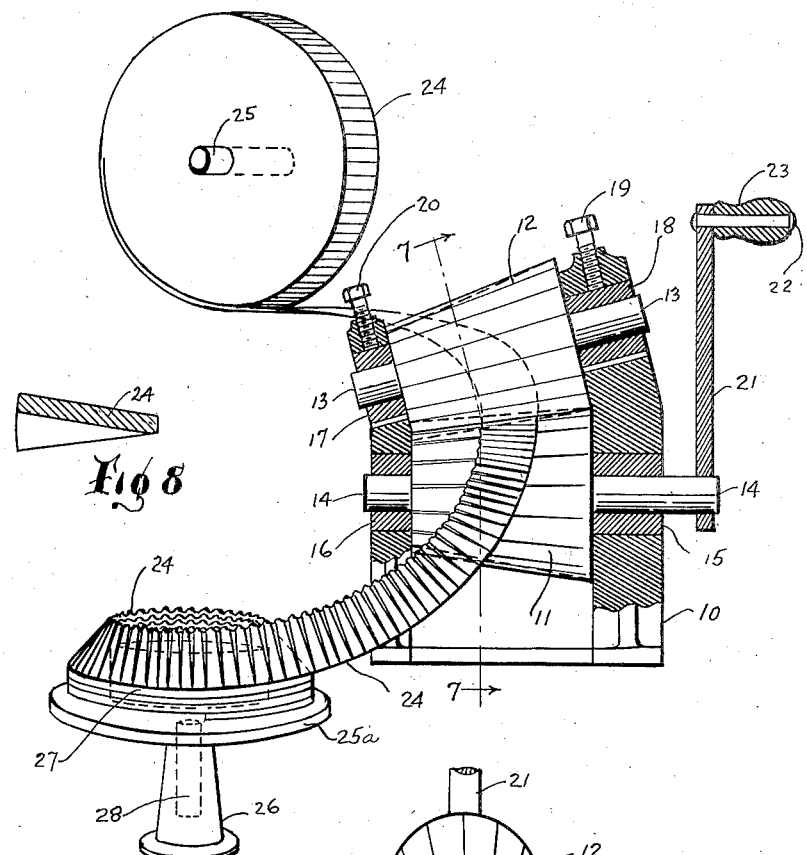
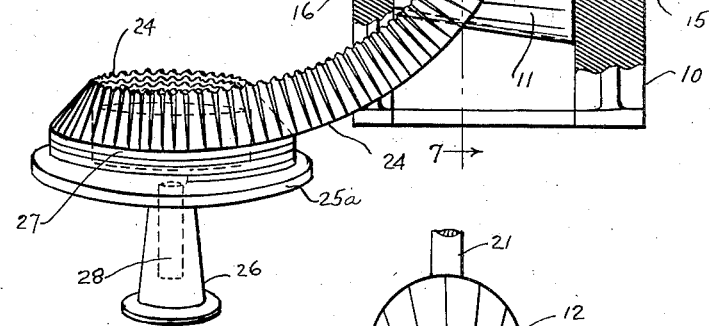
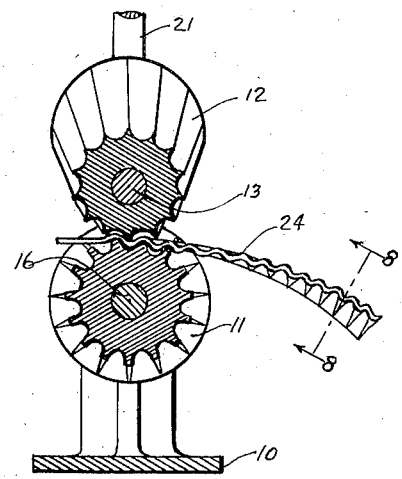
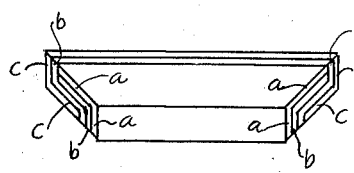
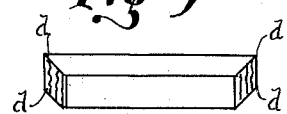
INVENTOR.

Patented Oct. 23, 1934

1,978,240

UNITED STATES PATENT OFFICE 1,978,240

MAKING OF PACKING RINGS

Harley T. Wheeler, Dallas, Tex.

Application January 19, 1931, Serial No. 509,622

3 Claims. (Cl. 154—2)

This invention relates to certain new and useful improvements in manufacturing packing rings and its chief advantage lies in a capability of forming the packing material into the desired shape of the finished ring without injury to the structure of the material.

One advantage of this invention is the possibility of using strips of material uniform in width to form the packing ring, regardless of the width or depth of the ring.

A further advantage is the use of a continuous strip of packing material for making rings of any depth.

A still further advantage is that the layers of packing material as they are wound into shape are always parallel before the ring is pressed into final shape, and that the edges of the strips will lie in concentric surfaces when the ring is completed.

Another advantage is that every ring may be made alike as to thickness and weight, and the density of the rings will always be under control.

Yet another advantage is that the necessity of applying binders to the packing material before moulding, is eliminated.

A still further and important advantage is the great speed and precision of the process, making possible the quantity production of an article of quality that heretofore has been largely hand-made and unduly expensive.

With these objects and advantages in view, further objects and advantages will be described in connection with the construction, accompanied by the drawings, wherein:

Figure 6 is a perspective view in cross-section showing a crimping machine and attachments for making packing rings according to this process.

Figure 7 is a cross-section of the crimping rolls, on line 7—7 of Figure 6.

Figure 8 is a cross-section of the packing material after it has been crimped, on line 8—8 of Figure 7.

Figure 9 is an outline cross-section of a cone-shaped packing ring showing distortion of packing layers occurring with the use of binders.

Figure 10 is an outline cross-section of a cone-shaped packing ring showing the wadding of layers occurring with the use of binders.

Figure 1:
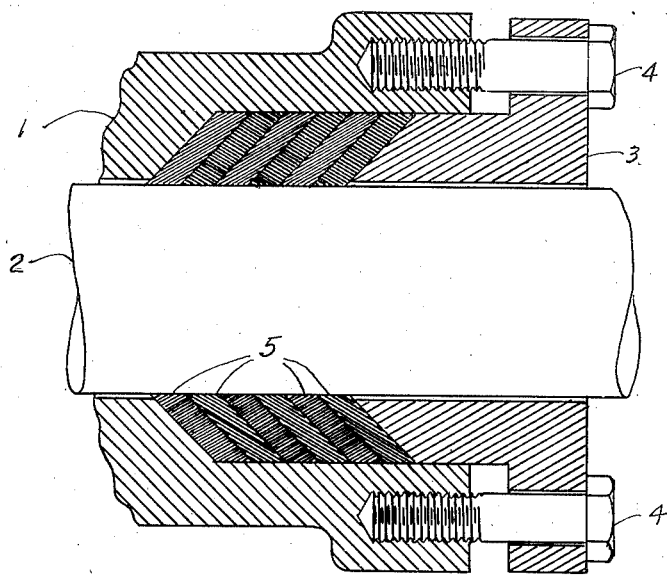
Figure 1 is a cross-section of a stuffing-box containing a series of cone-shaped packing rings made according to this process.

Referring now especially to Figure 1, casing 1 is an extension of a pump cylinder containing a stuffing-box thru which a rod 2 extends. The series of packing rings 5 are cone-shaped and are held in place against the bottom of the stuffing box by the gland 3, the latter also being cone-shaped to fit against the outside packing ring. The tension of the series of packing rings 5 is controlled by the cap screws 4, 4. There is a clearance between the casing 1 and the rod 2, permitting any medium under pressure in the pump chamber to move outwardly and to press against the packing rings 5. This results in a firm contact of the packing rings 5 with the rod 2, thereby preventing any leakage from the pump chamber. The greater the pressure against the rings 5, the greater will be their friction against the rod 2, hence the less the chance of leakage past them. In Figure 1 as shown, the rings are positioned to resist leakage of pressure from the pump cylinder; should a vacuum occur on the instroke of the rod 2 during any part of the cycle of operation, it is easily understood that part of the rings 5 would be reversed in position, to seal the joint under all of the ranges of vacuum and pressure.

Figure 2:
Figure 2 is the cross-section of one cone-shaped ring as shown in the stuffing-box of Figure 1.

In Figure 2 is indicated a cross-section of one of the packing rings 5. A strip of suitable material is wound helically into multiple layers after being treated by a process which will be explained later, so that all of the layers are parallel to each other and so that the edges of each layer will contact with the rod 2. It should also be evident that the edges of all of the layers, both inside and outside, are concentric respectively with the rod 2 and the stuffing-box wall. As the strip is wound helically, the corresponding parts will be found on opposite sides of the center, as 6, 6; 7, 7; 8, 8; and 9, 9. At 8a is the inside end of the strip. Each ring when cut across a diameter is symmetrical. Also the layers of material are laminations in effect, each being acted upon by any pressure which passes thru the preceding ring, and each lamination forms a close contact with the rod 2 to seal off leakage.

Before proceeding with the description of the process, it would appear necessary to outline the present methods of forming moulded packing rings which bear a direct relation to the improvements of this invention. All moulded rings as now made have an application of some binder applied to the material while the latter is in strip form. The strips of material are then wound into a spiral ring, formed around a suitable mandril and the binder previously applied holds the the layers together. Then the spiral wound ring is formed in dies under intense pressure into the final shape, the layers assuming a helical position. When thus compressed the corrugations in the ring are flattened out so that the opposite sides of said ring lie in smooth surfaces without projections thereon. The binders used during manufacture do three useful things; first, holding the spiral ring together, second, holding the spiral-wound layers together while the ring is changed to some form of a helical-wound ring, third, holding the finished ring together during shipment and for installation in the machine. Essentially, the principle of moulded rings as now made, is to change a spiral-wound ring into a helical-wound type in dies by stretching the outer parts of the layers, and by compressing the inner edges.

Apparently binders have always been necessary for manufacturing moulded packing rings, yet they are admitted to be a hindrance to successful operation, especially when the ring is exposed to temperature. As it is the purpose of this process to eliminate the necessity of binders and avoid the harmful effects from their use, the damage caused by the customary use of binders during manufacture is also to be considered. To be efficient, a binder must temporarily or permanently cement the layers of the ring together in the first stage of spiral winding. Yet when pressure is applied to a spiral-wound ring when placed between suitable dies, apparently the binder is supposed to allow the spiral winds to slide on each other, the layers to remain parallel with each other and to assume a parallel position to the sides of the mould. Herein appears a paradox: if the binder is "tacky" enough to cement the layers together, the latter cannot slide freely on each other and remain parallel during the changes of shape, as is often claimed. Then if the binder is ductile enough to permit the layers to slide on each other freely, it will not be possible to keep the layers in the necessary position and relation while the outer layers of the ring are stretched as the inner edges are compressed. The layers will wad into an irregular mass. It then follows that a compromise must be effected; the layers must be stuck together in some degree, and it further follows that the edges of the layers will be pulled over each other so that in a finished ring the edges of the strips will appear on the curved faces of the rings, instead of forming a contact against the rod and with the stuffing-box wall.

The effect of the layers of material failing to slide on each other on account of the use of a binder is indicated by Figures 9 and 10, being examples of the two extremes. In Figure 9 is shown a cup-shaped ring, the width of the ring being several times the ring depth. Nominally, the width of the original spiral-wound ring is equal to the slope of the finished cone-shaped ring. When the change of shape is made in the dies, the inside surface of the cone-shaped ring will be found to consist of layer $a$, both on the end face and the inside edge. The outer surface and the outer edge will be composed of layer $c$. Layer $b$ will lie inside of layers $a$ and $c$, and both edges of layer $b$ will protrude in the curved end faces. The result of pulled-over edges occurs in varying degrees, according to the relation of ring width to ring depth, to the "tackiness" of the binder, and is augmented by the resistance of the outer edges of the material strips to being stretched.

A further defect is introduced into such rings when the layers are pulled over each other, the sharp edges of the dies breaking or bruising the structure of the layers, these ruptures afterward causing failure of the rings while in service.

Figure 10 is shown a relation of ring width equal to, or less than the ring depth. The material strips are narrow and when the spiral-wound ring is pressed into th die, there is not sufficient bond between the layers to provide the leverage necessary to turn the layers over at an angle; the layers therefore maintain more or less a position parallel to that of the original spiral-wound ring, as $d$, $d$. The shape of the die is impressed as a ring and an effect is secured of wadding the layers of material.

Between the extremes indicated by Figures 9 and 10 are certain relations favorable to maintaining parallelism between the layers during the change of shape. But it should be evident that the range is narrow. The process of this invention as herein described, operates efficiently regardless of the ring width or depth, and without binders.

A further defect in customary manufacture of packing rings which this process eliminates, is the breaking of the strip structure when the ring is changed from spiral-wound to helical wound shape. It appears that a ring made of spiral winds when changed into a helical wind of any shape, that the outside edges of the layers will be considerably stretched, while the inside edges are contracted and compressed to a high degree, both according to the pressure of the dies. The limiting factor is that strips over a certain width will pull apart on the outside edge during the stretching, and also, so much material will be forced toward the center that the dies cannot compress properly. This may be overcome somewhat by the use of very soft and ductile materials, but these are rarely suitable for packing purposes.

A further practical consideration is that pressure on the dies must be applied correctly; if the speed of closing is too great, the layers will not slide on each other because the bonding power of the binder requires time for the change; if the speed is too slow the spiral-wound ring will not change to a helical wound, as the layers will remain up-ended and form a wadded mass. A still further practical consideration is that when the punch strikes the spiral-wound ring to force the latter into the die, both punches and dies are quickly worn at the points of initial contact, thus eroding the die faces and causing a high replacement cost which is charged to the selling price, being a detriment to marketing.

The foregoing defects in forming moulded rings from strips of fabric and other materials has been for some time apparently remedied by using a cement which can be vulcanized while the fabric layers are still in the mould. Thus all of the layers, whether broken or over-compressed are bound together by a flexible medium. But such cements usually consist of rubber or similar compounds and are undesirable from an operating standpoint, giving high friction and being subject to excess expansion from change of temperature.

As the apparent goal in making all packing rings is to use thin strips of uniform width and of suitable material which can be obtained at least cost, to then change the shape of these strips into helical winds of a certain shape, the layers being parallel with each other and the edges of the strips being in contact with the rod and with the stuffing-box wall, I have developed the process before mentioned to attain the result, but also eliminating the defects of manufacture such as occur thru the temporary or permanent use of binders.

Referring now especially to Figure 6, a crimping machine is shown, being used to shorten one side of a straight strip of material. In explanation of the process, for example, a strip of material which is crimped on one side, the corrugations tapering off to nothing at the other side, may be wound helically into a cone of any angle. It is only necessary to select the strip material equal in width to the sloping face of the required cone. An infinite number of cones different in diameter or in slope may be made with the same width of strip, as the flexibility provided by the corrugations on the shortened side permit the adjustments necessary. Likewise, shapes other than cones may be made by selecting the correct crimping rollers, as indicated by the special rings of Figures 3, 4 and 5.

To complete the description of Figure 6, the crimping machine composed of a base 10, the crimping rollers 11 and 12, and the parts incidental to operating the rollers. The roller 11 is mounted on the shaft 14, is supported in the rigid bearings 15 and 16 and is rotated by lever 21, the latter being fixed to an extension of the shaft 14. A handle 23, rotatable on the pin 22, is for conveniently turning the arm 21. The crimping roller 12 is mounted on a shaft 13, the latter supported in adjustable bearings 17 and 18. The cap screws 19 and 20 respectively, determine the position of the bearings 18 and 17, thus adjusting the clearance between the crimping rolls 11 and 12. To make the adjustment clearer, Figure 7 shows a cross-section of the roller 11 and 12, each being fluted with the same pitch, the crests of the flutes of one roller meshing into the troughs of the flutes of the mating roller, crimping the material strip 24.

Returning now to Figure 6, a coil of suitable material 24 uniform in width is supported on the shaft 25. The strip 24 is unwound and inserted between the rolls 11 and 12, and being heavily crimped one side and uncrimped on the other, curves naturally into helical winds which are received by the turntable 25a. The latter rotates easily on a spindle 28, being mounted in a base 26. As the crimped strip 24 is fed onto the table 25a, a guiding boss 27 determines the diameter of the cone-shaped ring.

Figure 8 shows a cross-section of the strip 24 on line 8—8 of Figure 7, indicating how the crimping action of the rolls 11 and 12 shorten one side of the strip 24 and provide a flexibility which is utilized in forming the cone-shaped packing ring 5 of Figure 2.

Figure 3:
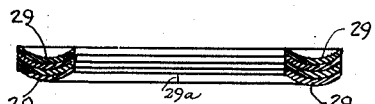
Figure 3 is the cross-section of a cup-shaped packing ring made according to this process.

While a cone-shaped ring has been used as the example for justifying this process, it should be apparent that a variety of shapes may be produced. In Figure 3 is shown a cup-shaped ring which is difficult to form correctly by any other process, the stretching of the material structure being excessive if a spiral wound ring is used as a basis for formation. In this style, Figure 3, the rollers 11 and 12 would be convex and concave respectively, the flutes at one side. The material strip starts at 29a, and the layers 29, 29, are alike and symmetrical. By using this process of crimping, a straight strip of material may be formed directly into a helical wind without stretching the material beyond its original texture.

Figure 4:
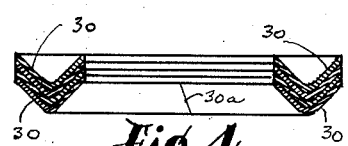
Figure 4 is the cross-section of a V-shaped packing ring made according to this invention.

In Figure 4 is shown a useful pressure-set moulded packing ring, the customary methods of making it crack the texture of the material at the point of the V. After a short time in service the ring breaks and splits in the V, the rupture having been started during the process of moulding. By my process, the rollers 11 and 12 are made internal and external V shapes, fluted on corresponding sides and made to mesh with each other. The V in the straight strip of material is formed without stretching the material and the crimped strip can be curved directly in helical winds of the proper diameter and pressed to finished dimensions.

Figure 5:
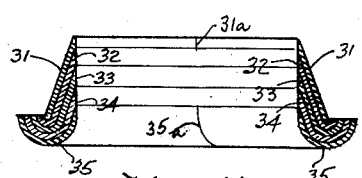
Figure 5 is the cross-section of a lipped ring made according to this process.

Another useful shape is that of a pressure-set, extension-lip form of moulded packing ring, as is indicated by Figure 5. The crimping rollers 11 and 12 are partly straight and partly curved, the strip 24 being changed in position by a moving shuttle as the strip passes thru the rollers. The curved portion of the ring is made first and starts at 35a, then after one turn of the material the curved portion 35 is changed to have a short straight lip as 34, then layers 33, 32, 31 have successively longer lips, the strip stopping at 31a. When pressed in a die the varying sections are easily formed to the desired shape without injury to the material structure.

Returning now to the operation of this process, especially as it refers to the formation of cone-shaped rings, as in Figure 6, materials which have a measure of stiffness, such as woven asbestos, any cloth with wire insertion, and the like, will retain a crimp indefinitely. But such materials as cotton, will straighten again after the crimping is performed. Such soft materials are treated with a stiffener, which after drying will have a glossy surface and cause the material to retain the crimped shape, yet does not act as a binder. For example, paraffin will harden quickly and causes the cloth to retain the crimp, yet may dissolve or dissipate after the ring is in service: the stiffener will permit the layers to slide on each other, yet has no holding power. There are unlimited numbers of similar stiffeners which may be used in like manner.

After the finished packing rings are removed from the mould, it will be possible to pull the layers apart so that it is advisable to spray or paint the outside and inside edges with some tough, elastic cement, such as a lacquer. This will maintain alignment for shipping purposes, but will wear off immediately after the ring is placed in service and permit each layer to be acted upon by the pressure.

Should it be desirable to permanently cement the layers of rings together to meet certain conditions of operation, by this process such binders are added after the crimping is performed and just before moulding. Thus the binder will not interfere with the positioning of the helical layers, and the edges of the material strip can be brought to contact with the inner and outer diameters.

It should be apparent that the process herein described is capable of unlimited variations and that it may be used in ways not described herein in detail. Such variations, however, as are included in the appended claims, are construed as being based on the principle of this process.

I claim:

1. A method of forming packing rings consisting of taking a flat strip of porous flexible material, forming transverse corrugations in said strip of greater depth at one side edge than on the other, coiling said strip into a helically wound ring, placing said ring in a tapered annular mold and subjecting the same to high pressure to eliminate the corrugations therein and thus forming said ring into a frusto-conical shape with smooth upper and lower faces.

2. The method of forming packing rings of helical layers consisting of shortening one edge of a strip of porous flexible material by forming tapered corrugations therein to predetermine the curvature thereof, placing a suitable number of superposed layers within a tapered mold and then by pressure eliminating said corrugations and forcing said layers into parallel positions with smooth upper and lower surfaces and with their inner and outer edges all parallel.

3. The method of forming packing rings which comprises crimping a strip of porous material transversely thereof, the crimp being deeper on one side of said strip than on the other, coiling said strip to form a ring and subjecting said ring to a molding operation under high pressure whereby to give the coils of said ring a substantially planar surface and to give the ring itself a substantially conical form.

HARLEY T. WHEELER.